United States Patent [19]

Yamaguchi et al.

[11] 4,389,585
[45] Jun. 21, 1983

[54] SUPERCONDUCTIVE ROTOR

[75] Inventors: Kiyoshi Yamaguchi, Hitachi; Naoki Maki, Tokai; Toshio Tamura, Hitachiohta, all of Japan

[73] Assignee: Hitachi, Ltd., Tokyo, Japan

[21] Appl. No.: 279,552

[22] Filed: Jul. 1, 1981

[30] Foreign Application Priority Data

Jul. 1, 1980 [JP] Japan .................................. 55-88479

[51] Int. Cl.³ .............................................. H02K 9/00
[52] U.S. Cl. ...................................... 310/52; 310/61; 310/261
[58] Field of Search ...................... 310/64, 61, 51, 58, 310/59, 40, 52, 54, 165, 60 R, 10, 65, 261; 62/55, 505

[56] References Cited

U.S. PATENT DOCUMENTS

| | | | |
|---|---|---|---|
| 3,816,780 | 6/1974 | Smith et al. | 310/52 |
| 3,986,341 | 10/1976 | DeHaan | 62/55 |
| 3,991,587 | 11/1976 | Laskaris | 62/55 |
| 4,092,555 | 5/1978 | Ying et al. | 310/52 |
| 4,164,126 | 8/1979 | Laskaris et al. | 62/55 |
| 4,164,671 | 8/1979 | Gamble | 310/52 |
| 4,207,745 | 6/1980 | Pouiliange | 310/54 |
| 4,309,632 | 1/1982 | Muller et al. | 62/505 |

Primary Examiner—R. Skudy
Attorney, Agent, or Firm—Antonelli, Terry & Wands

[57] ABSTRACT

This invention relate to a structure for supporting a power lead connected to a superconductive field coil and refrigerant supply and discharge pipes in the hollow shaft of the superconductive rotor. A plurality of spacers for holding the power lead and the refrigerant supply and discharge pipes are fitted in a supporting sleeve, and fixed from the outer peripheral side of the supporting sleeve, the supporting sleeve itself being fixed in the cavity of the hollow shaft. Since the fixing work can be made from the outer peripheral side by means of the structure stated above, it is possible to fix the leads and pipes to the inside of the shaft easily and rigidly, and to avoid the generation of vibration so as to prevent serious damage to the stability of the superconductive state of the rotor.

9 Claims, 4 Drawing Figures

SUPERCONDUCTIVE ROTOR

BACKGROUND OF THE INVENTION

The present invention relates to a superconductive rotor having a superconductive field coil such as used in a generator or a motor, and, more particularly, to a structure for supporting a power lead, refrigerant supply, and discharge pipes of the superconductive rotor.

The term "superconductive rotor" is generally used to mean a rotor having a field coil constituted by a superconductive material. Since the superconductive rotor has a superconductive coil, it is necessary to install a power lead for supplying the exciting electric current to the coil and pipes for circulating a refrigerant such as helium to cool the coil itself and the rotor structure. The power leads and the pipes extend through a hollow shaft at the opposite side of the prime-mover or load of the superconductive rotor. The power lead is connected to a stationary power supply at the end of this shaft through a slip ring while the pipes are connected to a refrigerant supplying and discharging device through a refrigerant transfer joint or coupling as shown in U.S. Pat. No. 4,164,671. Therefore, the power lead and pipes are considerably longer in comparison with their diameters. In consequence, it is necessary to fix the power lead and the pipes to the inside of the shaft and to prevent them from vibrating, so that the function of these power leads and pipes can be well performed.

In this superconductive rotor, the power leads and the pipes for refrigerant extend through the cavity in the hollow shaft and, accordingly, have considerably large lengths. In the conventional superconductive rotor, these power leads and pipes are supported inside the shaft by means of a plurality of spacers which are arranged at suitable pitches in the axial direction therebetween. In order to make it easy to mount the spacer on the shaft, however, it is necessary to provide a certain gap between the spacer and the shaft.

For this reason, in the conventional superconductive rotor, the power leads and the pipes can not be fastened firmly to the inside of the shaft.

Moreover, it is more significant that, in conventional superconductive rotors, the center of gravity of the power leads and pipes tied by the spacers does not coincide with the axis of the rotor.

SUMMARY OF THE INVENTION

It has been discovered that the gap between the spacer and the shaft, and the difference between the center of the gravity and the central axis of the rotor cause an unusual vibration of the power leads and pipes, and present a serious damage to stability of superconductive state of the rotor.

Accordingly, an object of the present invention is to provide a superconductive rotor in which the power lead and pipes for refrigerant are rigidly fixed to the inside of the shaft such that between the center of gravity of the constituents inside the shaft such as, for example the power leads and pipes, and the central axis of the rotor coincides thereby avoiding the generation of vibration, and overcoming the above-described problems of the prior art.

To this end, according to the invention, there is provided a superconductive rotor in which a plurality of spacers for holding the power leads and the refrigerant supply and discharge pipes are fitted in a supporting means, and fixed from the outer peripheral side of the supporting means, the supporting means itself being fixed in the cavity of the hollow shaft.

For the invention, it is preferable that the supporting means is adjustably fixed in the cavity of the shaft with adjustable fixing means such as bolts which connect the supporting means to the shaft.

DETAILED DESCRIPTION OF THE PREFERRED EMBODIMENTS OF THE INVENTION

Figure 1:
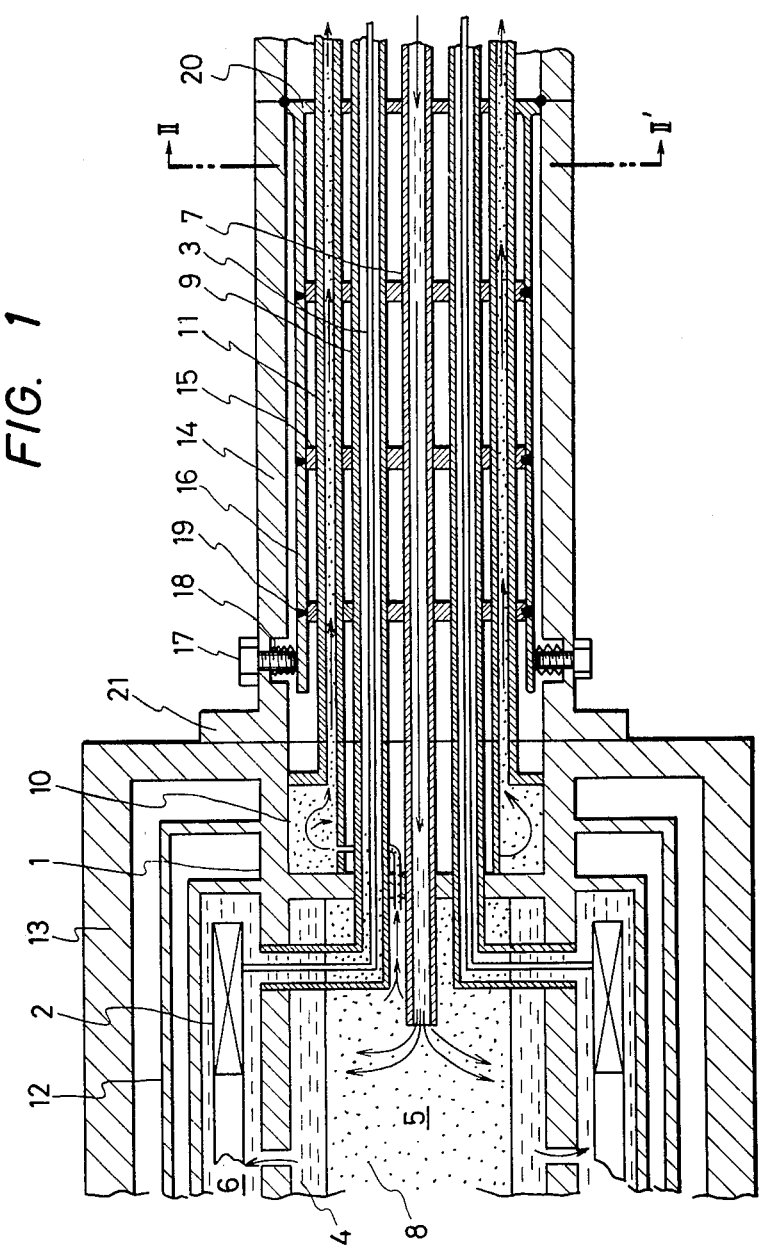
FIG. 1 is a sectional view showing a supporting structure constructed in accordance with the present invention for supporting power leads and refrigerant supply and discharge pipes in an embodiment of a superconductive rotor at an end opposite a prime mover or load.

Referring now to the drawings wherein like reference numerals are used throughout the several views to designate like parts and, more particularly, to FIG. 1 according to this Figure a superconductive field coil 2, fixed to a torque tube 1, is adapted to be excited by exciting electric current supplied through a power lead 3 which, in turn, is supplied with the exciting electric current, through a slip-ring (not shown) connected thereto, from a stationary power supply (not shown). A central portion of the torque tube 1 constitutes a tank 5 for a liquid refrigerant 4 with the liquid refrigerant 4 being supplied from the tank 5 to a field coil 6 so as to cool the latter. The liquid refrigerant 4 is supplied through a refrigerant supply pipe 7, with an evaporated fraction 8 of the refrigerant being supplied through a power lead cover pipe 9 and a cooling duct 10 to the power lead 3 and the torque tube 1 to reduce the heat transfered to the field coil 6. The refrigerant supply pipe 7, refrigerant discharge pipe 11 and the power lead cover pipe 9 are connected through a refrigerant supplying and discharging device (not shown) to a stationary refrigerant supply source and refrigerant receiving section (not shown).

The radiation heat input from the outside of the rotor is shielded by a shield 12. The major constituents of the rotor include an outer sleeve 13 and a shaft 14. The outer sleeve 13 functions as a vacuum vessel and an electromagnetic damper shield. The shaft 14 carries the outer sleeve 13 and the torque tube 1, and is rotatably supported by means of bearings (not shown).

A refrigerant supply pipe 7, refrigerant discharge pipe 11 and a power lead cover pipe 9 are held by means of a plurality of spacers 15 arranged at suitable intervals in the axial direction. The spacers 15 are made of a reinforced plastic, steel or the like material. These spacers 15 are fitted in a supporting sleeve 16, made of stainless steel or the like material, and are fixed to the latter. Since the supporting sleeve 16 has a weight much less than that of the shaft 14, the fitting of the spacers 15 in the supporting sleeve 16 can be made without substantial difficulty. The fixing of the spacers 15 to the supporting sleeve 16 is accomplished by applying an adhesive through apertures 19 formed in the portions of wall of the supporting sleeve 16 whereby the spacers 15 are supported from the outer peripheral side of the supporting sleeve 19. If the spacers 15 and the supporting sleeve 16 are accomplished of weldable metals, the fixing may be made by welding.

After the fitting of the shaft 14, the inner end of the supporting sleeve 16 is centered by means of three bolts 17 threadably inserted from the outer side of the shaft 14, through a sealing bellows 18. On the other hand, a partition plate 20, integrally formed at the outer ends of the supporting sleeve 16, extends radially from the outer ends so as to maintain a vacuum at the inside of the rotor. The partition plate 20 is fixed, by welding, to the opening portions of the shaft 14 so that the supporting sleeve 16 is fixed to the shaft 14. Thus, the supporting sleeve 16 is supported by the shaft 14 at two axially spaced points. The supporting sleeve 16 having much greater diameter than the pipes exhibits a high flexural rigidity and, accordingly, prevents a generation of vibration.

Figure 2:
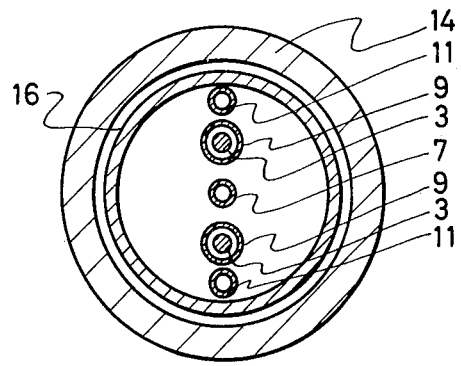
FIG. 2 is a cross sectional view taken along a line II—II' in FIG. 1.
Figure 3:
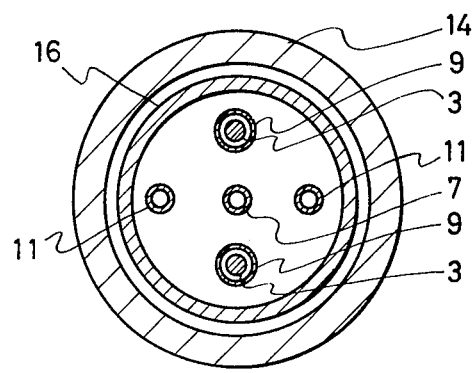
FIG. 3 is a cross sectional view of a supporting structure of another embodiment of the present invention.
Figure 4:
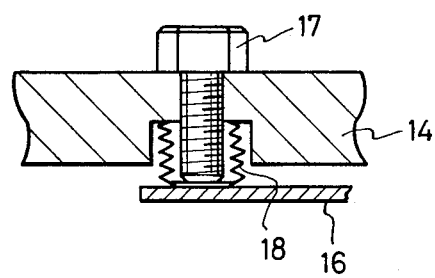
FIG. 4 is a sectional view of a part of the structure shown in FIG. 1.

As shown in FIG. 2, the power leads 3, the refrigerant supply pipes 7 and the refrigerant discharge pipes 11 may be disposed alignment; however, as shown in FIG. 3, since the space in the hollow shaft 14 is so narrow it is advantageous for the leads 3 and refrigerant supply and discharge pipes 7, 11 to be disposed separately from one another to facilitate manufacturing.

Thus, according to the invention, since the fixing work can be made from the outer peripheral side, the work can be done quite easily and it is possible to fix the power lead and the refrigerant supply and discharge pipes 7, 11 to the shaft 14 with very little gap so as to prevent the generation of vibration. In addition, it is possible to adjust the center of the rotational gravity of the components inside of the shaft 14 such as the power leads and pipes so as to coincide with the central axis of the rotor thereby avoiding the generation of vibration and avoiding the possibility of serious damage to the stability of superconductive state of the rotor.

We claim:

1. A superconductive rotor comprising a torque tube, a superconductive field coil supported by said torque tube, a hollow shaft connected to said torque tube, at least one power lead passing through said hollow shaft for supplying exciting electric current to said superconductive field coil, refrigerant supply and discharge pipes extending through said hollow shaft for supplying and discharging a refrigerant to cool said superconductive field coil, a plurality of spacer means disposed in the hollow shaft for holding said at least one power lead and said pipes, supporting sleeve means axially extending through said hollow shaft for securing thereto said spacer means, and adjusting means for supporting one axial end portion of said supporting sleeve means and for enabling a centering of said supporting sleeve means with respect to said hollow shaft from an outer side of said hollow shaft.

2. A superconductive rotor comprising a torque tube, a superconductive field coil supported by said torque tube, a hollow shaft connected to said torque tube, at least one power lead passing through said hollow shaft for supplying exciting electric current to said superconductive field coil, refrigerant supply and discharge pipes extending through said hollow shaft for supplying and discharging a refrigerant to cool said superconductive field coil, a, plurality of spacers disposed in the hollow shaft for holding said at least one power lead and said pipes, an axially extending supporting means for securing thereto said spacer means, said supporting means being inserted and fixed in said cavity of said hollow shaft, and means for centering said supporting means in relation to said hollow shaft including three bolts screwed from the outer side of the hollow shaft at the same axial position.

3. A superconductive rotor comprising a torque tube, a superconductive field coil supported by said torque tube, a hollow shaft connected to said torque tube, at least one power lead passing through said hollow shaft for supplying exciting electric current to said superconductive field coil, refrigerant supply and discharge pipes extending through said hollow shaft for supplying and discharging a refrigerant to cool said superconductive field coil, a plurality of spacer means disposed in the hollow shaft for holding said at least one power lead and said pipes, an axially extending supporting means for securing thereto said spacer means, said supporting means being inserted and fixed in said cavity of said hollow shaft, adjusting means for supporting one axial end portion of said supporting means and for enabling centering of said supporting means with respect to said hollow shaft from an outer side of said hollow shaft, and partition plates for maintaining a vacuum in said rotor provided at an axial end portion of said supporting means.

4. A superconductive rotor comprising a torque tube with a refrigerant tank means for accommodating a supply of refrigerant, a superconductive field coil supported by said torque tube, a hollow shaft connected to said torque tube, at least one power lead passing through said hollow shaft for supplying exciting electric current to said superconductive field coil, refrigerant supply and discharge pipes extending through said hollow shaft for supplying and discharging a refrigerant for cooling said superconductive field coil, a plurality of spacer means disposed in the hollow shaft for holding said power lead and said pipes, a supporting sleeve means extending through said hollow shaft for securing thereto said spacers, and adjusting means for supporting one axial end portion of said supporting sleeve means and for enabling a centering of said supporting sleeve means with respect to said hollow shaft from an outer side of said hollow shaft.

5. A superconductive rotor comprising a torque tube, a superconductive field coil supported by said torque tube, a hollow shaft connected to said torque tube, at least one power lead passing through said hollow shaft for supplying exciting electric current to said superconductive field coil, refrigerant supply and discharge pipes extending through said hollow shaft for supplying and discharging a refrigerant to cool said superconductive field coil, a plurality of spacer means disposed in the hollow shaft for holding said at least one power lead and said pipes, an axially extending supporting sleeve means extending through said hollow shaft for securing thereto said spacer means, said supporting sleeve means being inserted and fixed in a cavity of said hollow shaft, and means for centering said supporting sleeve means including three bolts threadably inserted from an outer side of the hollow shaft at the same axial position.

6. A superconductive rotor according to claim 2 or 5, further comprising a sealing bellows through which said three bolts are screwed.

7. A superconductive rotor according to one of claims 1 or 5, wherein means are provided in said supporting sleeve means for enabling a fixing of the spacer means from an outer peripheral side of said supporting sleeve means.

8. A superconductive rotor according to one of claims 1, 4 or 5, wherein means are provided at an axial end portion of said supporting sleeve means for preventing a vacuum in said rotor.

9. A superconductive rotor according to one of claims 1 or 5, wherein the refrigerant supply and discharge pipes and said at least one power lead are disposed in alignment in said supporting sleeve means.

* * * * *